(12) United States Patent
Ord et al.

(10) Patent No.: US 11,708,811 B2
(45) Date of Patent: Jul. 25, 2023

(54) ADJUSTED IGNITION TIMING FOR ENGINE RESTART

(71) Applicant: Ford Global Technologies, LLC, Dearborn, MI (US)

(72) Inventors: David Ord, Woodhaven, MI (US); Brad VanDerWege, Plymouth, MI (US); Joseph Thomas, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 158 days.

(21) Appl. No.: 17/196,857

(22) Filed: Mar. 9, 2021

(65) Prior Publication Data

US 2022/0290646 A1 Sep. 15, 2022

(51) Int. Cl.
*F02P 5/00* (2006.01)
*F02P 5/15* (2006.01)

(52) U.S. Cl.
CPC .................... *F02P 5/15* (2013.01)

(58) Field of Classification Search
CPC .................. F02P 5/15; Y02T 10/40
See application file for complete search history.

(56) References Cited

U.S. PATENT DOCUMENTS

| 4,841,925 A | 6/1989 | Ward |
| 6,283,087 B1 | 9/2001 | Isaksen |
| 6,947,830 B1 | 9/2005 | Froloff et al. |
| 7,011,063 B2 | 3/2006 | Condemine et al. |
| 7,624,712 B1 * | 12/2009 | Pursifull ............... F02D 41/009 123/179.7 |
| 8,370,051 B2 * | 2/2013 | Pursifull ............... F02N 15/003 701/112 |
| 10,781,758 B2 * | 9/2020 | Kanno ................ F02N 11/0814 |
| 10,920,732 B1 | 2/2021 | Ord et al. |
| 11,421,639 B2 * | 8/2022 | Doering ............. F02N 11/0818 |
| 2007/0062476 A1 * | 3/2007 | Ota ....................... F02B 23/104 123/179.4 |
| 2008/0077308 A1 | 3/2008 | Laubender |
| 2008/0154484 A1 * | 6/2008 | Takeyama ............ F02D 41/065 701/113 |
| 2011/0144891 A1 * | 6/2011 | Nakamura ........... F02D 41/068 701/104 |
| 2013/0080036 A1 * | 3/2013 | Yamauchi ............ F02D 41/065 701/112 |

(Continued)

FOREIGN PATENT DOCUMENTS

| JP | 2007092731 A * | 4/2007 | ............ F02B 23/104 |
| WO | 2010106259 A1 | 9/2010 | |

*Primary Examiner* — Jacob M Amick
*Assistant Examiner* — Sherman D Manley
(74) *Attorney, Agent, or Firm* — Vincent Mastrogiacomo; McCoy Russell LLP

(57) ABSTRACT

Methods and systems are provided for restarting an engine following an engine idle-stop. In one example, a method may include, prior to an engine restart following an idle-stop, adjusting a spark ignition timing based on an estimation of a fuel-air equivalence ratio (phi) and an estimation of a cylinder turbulence. Optimal spark ignition timing based on estimated phi and cylinder turbulence during engine restart may result in stabilized combustion and a torque output sufficient to at least partially relieve demand on the starting device.

20 Claims, 7 Drawing Sheets

(56) References Cited

U.S. PATENT DOCUMENTS

| | | | |
|---|---|---|---|
| 2014/0251267 A1* | 9/2014 | Hashemi | F02N 99/004 |
| | | | 123/345 |
| 2015/0159580 A1* | 6/2015 | Matsuda | F02D 37/02 |
| | | | 701/104 |
| 2015/0192081 A1* | 7/2015 | Ranspach | F02D 41/1456 |
| | | | 60/274 |
| 2018/0058407 A1* | 3/2018 | Hayashima | F02N 19/005 |

* cited by examiner

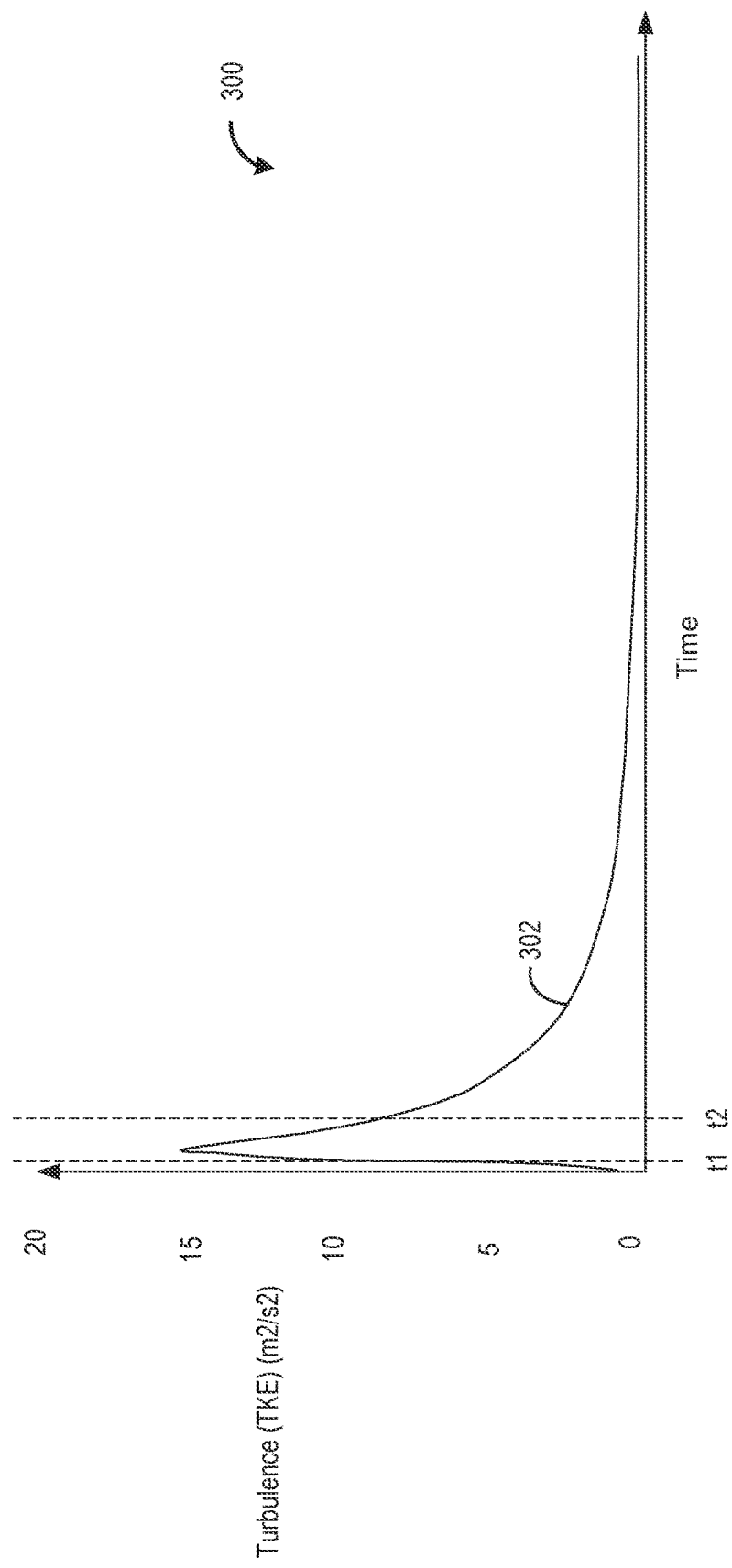

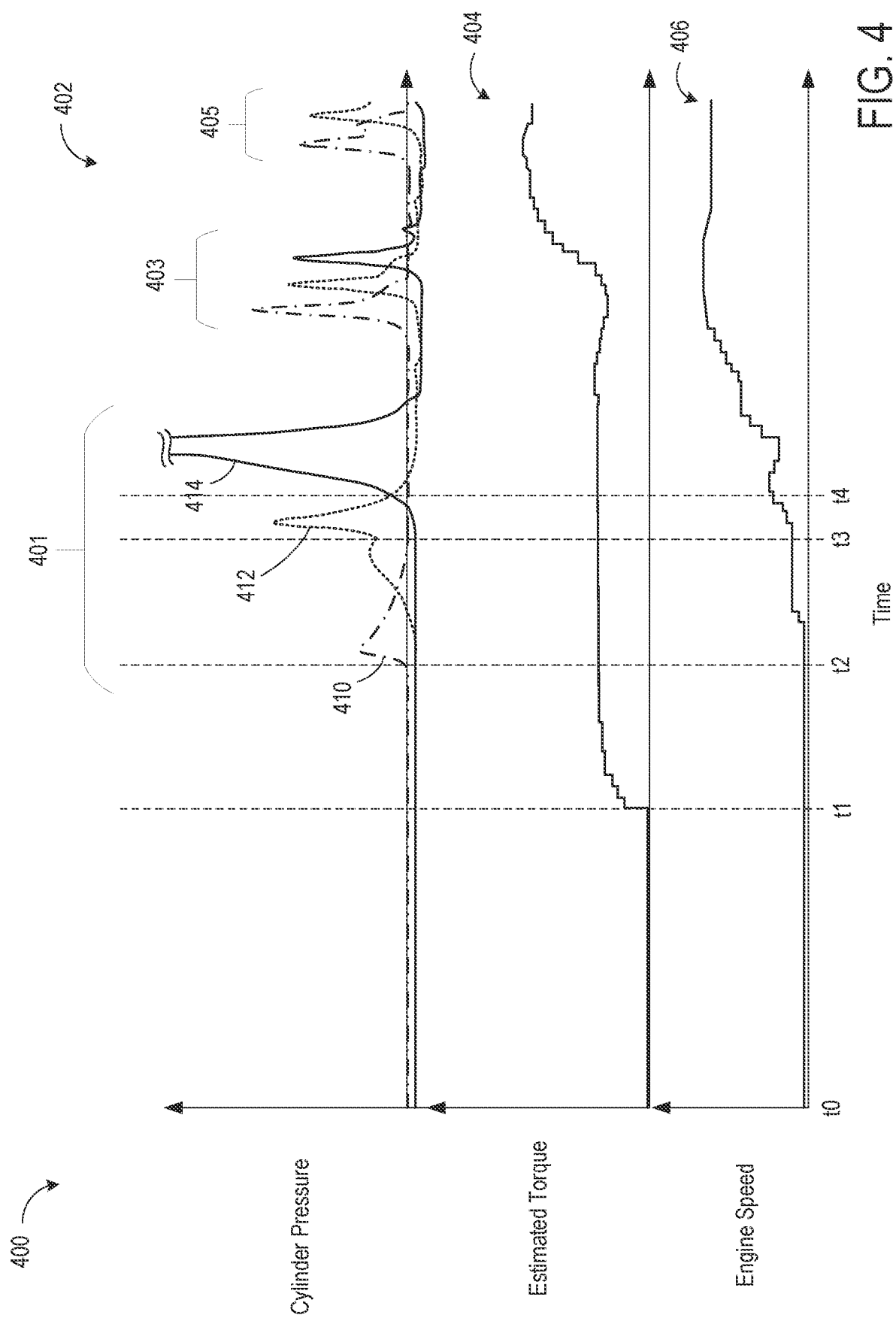

ADJUSTED IGNITION TIMING FOR ENGINE RESTART

FIELD

The present description relates generally to methods and systems for restarting an engine following an engine idle-stop.

BACKGROUND/SUMMARY

In a vehicle adapted with stop/start technology, an engine of the vehicle may be stopped and restarted numerous times over a drive cycle. For example, the engine may be automatically stopped when driver demand torque is low to conserve fuel and restarted with assistance from a starting device when demanded based on variations in vehicle conditions or a detection of an engine restart request, such as from operator input e.g., an accelerator pedal tip-in. Stop-start technology may increase fuel economy and reduce emissions by temporarily stopping combustion at the engine, therefore suspending fuel consumption and emission production. However, frequent utilization of a starter motor to restart the engine may shorten its useful life due to a finite number of starts associated with the starter motor. As such, an alternative method for restarting a warm, stabilized engine may be desired to prolong the life of the starter motor.

One alternative method for restarting an engine is expansion combustion (EC), which may reduce energy costs as well as a burden on the starter motor. In response to a request for restart at a stopped engine, fuel is injected into a cylinder of the engine during an expansion stroke of a cylinder piston. Subsequent combustion of the injected fuel provides an initial burst of torque to assist in rotating the engine. As such, EC may alleviate a load on a primary starting device, such as a starter motor.

However, the inventors herein have recognized issues with EC during engine restart. In one example, due to a combination of variable air-to-fuel ratio at a cylinder spark plug, leading to a non-optimal spark timing, and a low cylinder turbulence when the engine is stopped, an efficiency of EC may be low, for example, resulting in limited gain in fuel economy, e.g., 3-10% gain. The low efficiency may arise from insufficient mixing of the injected fuel with air within the cylinder to produce stable combustion. A weak torque output of EC may result, leading to increased fuel consumption that may at least partially offset any energy-saving benefits of EC and may drive a return to dependency on the primary starting device when EC results in poor torque output and combustion instability.

In one example, the issues described above may be at least partially addressed by, responsive to a request for engine restart during an engine idle-stop, adjusting a spark ignition timing based on an estimation of a fuel-air equivalence ratio in a cylinder and an estimation of a cylinder turbulence. As such, a likelihood of healthy combustion is increased in cylinders utilizing EC based on a prediction of an optimal spark ignition timing in the cylinders.

For example, the method may be executed by implementing a control strategy relying on computer-assisted engineering (CAE) to estimate when a fuel-air ratio at a spark plug of a cylinder is optimized for combustion following a fuel injection event. Furthermore, a cylinder turbulence may be similarly inferred and the spark ignition timing may be adjusted based on a period of elapsed time, relative to the fuel injection event, that provides a target combination of a rich combustion mixture at the spark plug and high turbulence. By adjusting the spark ignition timing in vehicles adapted with start/stop technology during engine restart, power provided by combusting fuel during the power stroke of the cylinder may be more efficiently harnessed and may provide greater torque assistance, thus decreasing a demand on an engine starting device to initiate engine rotation. As a result, emissions may be reduced while fuel economy of the vehicle and longevity of the starting device may be increased.

BRIEF DESCRIPTION OF THE DRAWINGS

FIG. 3 shows an example graph of estimated cylinder turbulence relative to time which may be used to adjust a spark ignition timing of the vehicle of FIG. 1 during the engine restart.

FIG. 4 shows an example graph plotting cylinder pressure, engine torque output, and engine speed during the engine restart.

DETAILED DESCRIPTION

Figure 1:
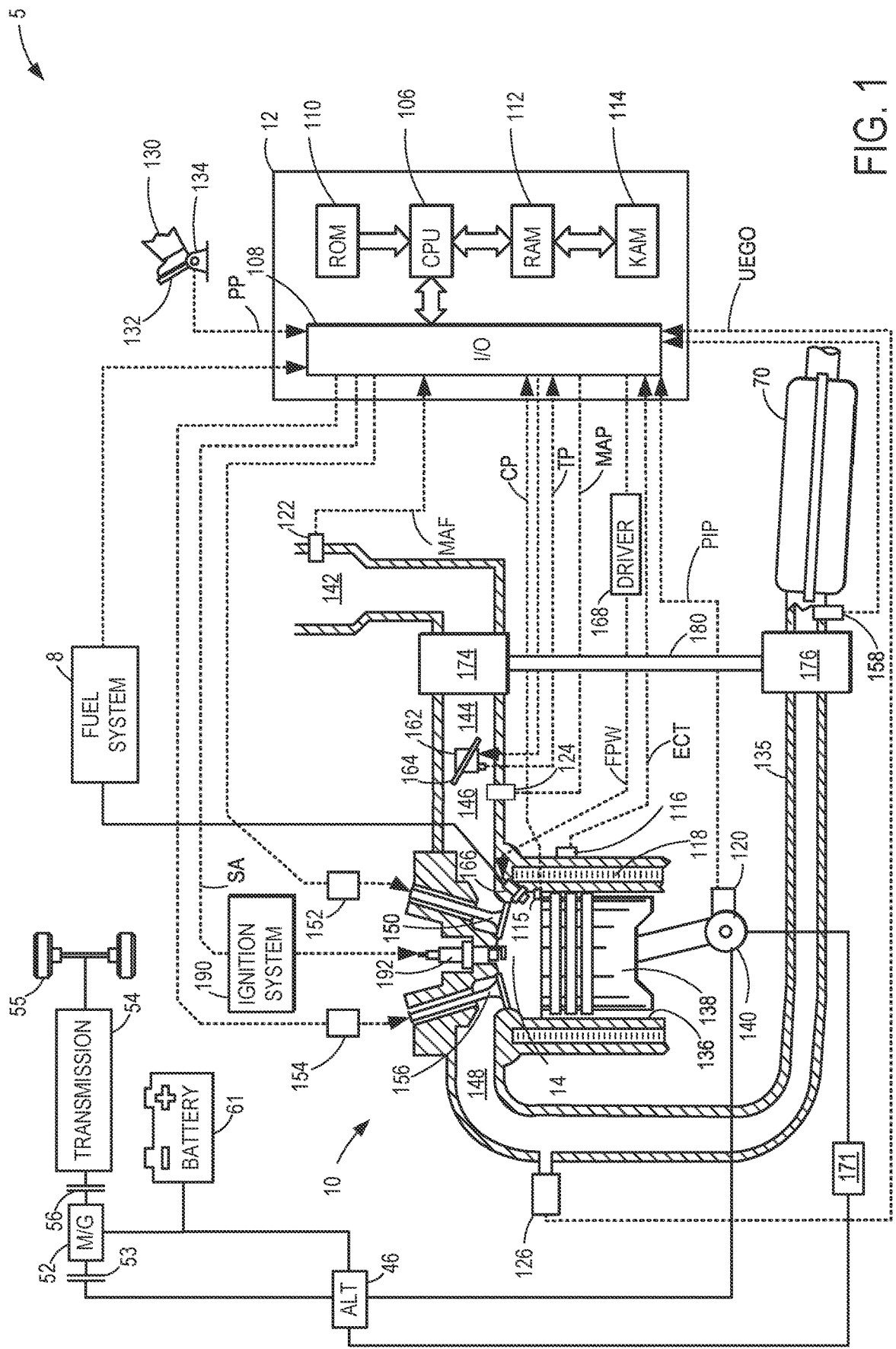
FIG. 1 illustrates a schematic of an engine included in a vehicle which may be configured with stop/start technology.
Figure 2:
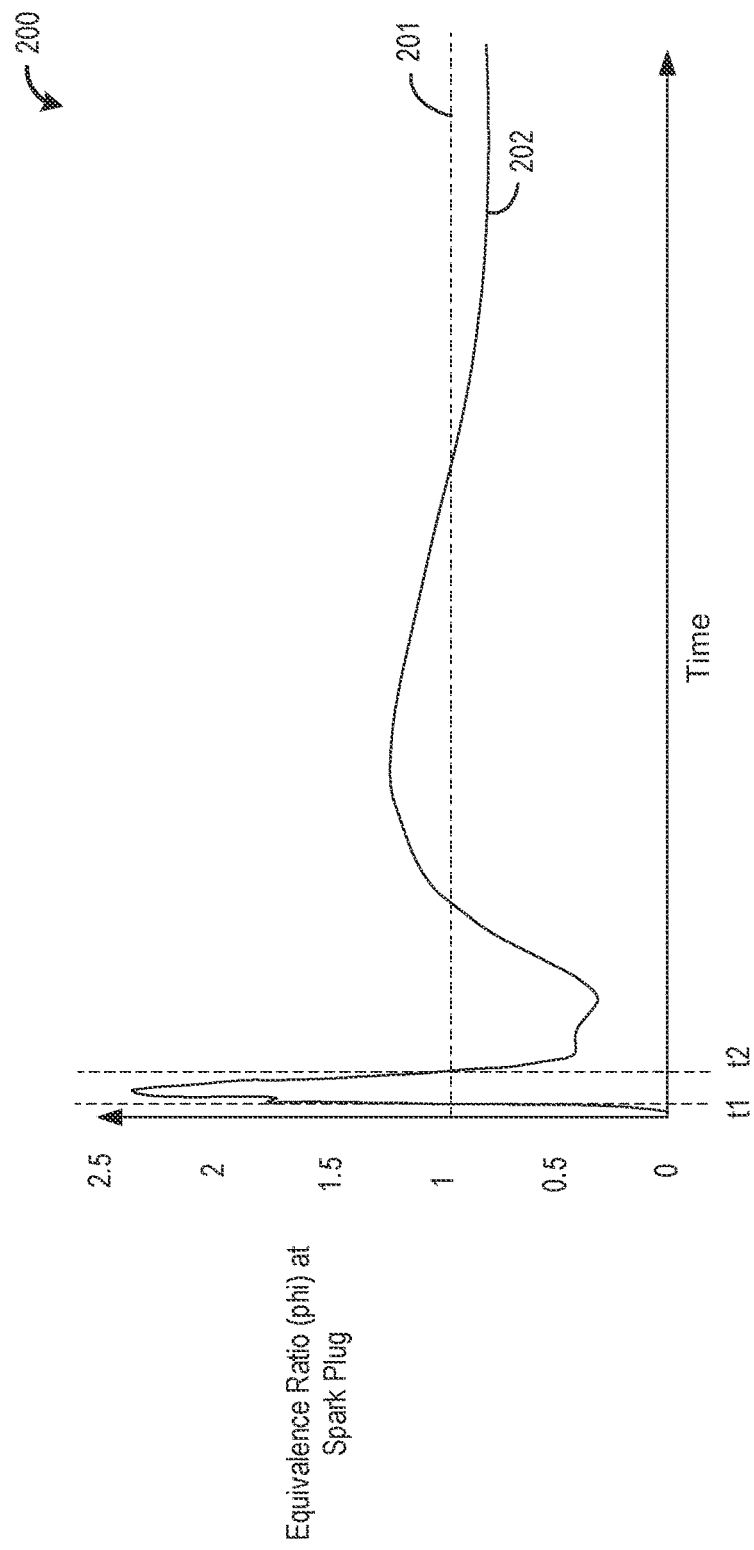
FIG. 2 shows an example graph of estimated fuel-air equivalence ratio (phi) relative to time which may be used to adjust a spark ignition timing of the vehicle of FIG. 1 during an engine restart.

The following description relates to systems and methods for restarting an engine following an engine idle-stop. An example engine system of a vehicle, which may be configured with stop/start technology, is shown in FIG. 1. An example graph showing an estimated fuel-air equivalence ratio, e.g., a value of phi, at a spark plug of a cylinder selected to perform expansion combustion (EC) during engine restart is shown in FIG. 2. The estimated value of phi relative to time following a fuel injection event may be used to adjust spark ignition timing during the engine restart. Furthermore, estimated cylinder turbulence in the selected EC cylinder is similarly plotted in FIG. 3 relative to time after the fuel injection event, which may be used in combination with the estimated phi to adjust spark ignition timing during engine restart. An example graph showing relationships between cylinder pressure, engine torque output, and engine speed during engine restart is shown in FIG. 4. An engine controller may be configured to perform a control routine, such as the example routine of FIGS. 5A and 5B, to coordinate operation of a starting device and EC in the selected cylinder during engine restart following the idle-stop. An example timeline showing variations in engine operations and parameters during an engine restart after idle-stop is shown in FIG. 6.

Turning to the figures, FIG. 1 depicts an example of an internal combustion engine 10, which may be included in a vehicle 5. In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutch is engaged. In the depicted example, a first clutch 53 is provided between crankshaft 140 and electric machine 52, and a second clutch 56 is provided between electric machine 52 and transmission 54. Controller 12 may send a signal to an actuator of each of the first clutch 53 and the second clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 61 may be a traction battery that delivers electrical power to electric machine 52 to provide torque to vehicle wheels 55. In some embodiments, electric machine 52 may also be operated as a generator to provide electrical power to charge system battery 61, for example, during a braking operation. It will be appreciated that in other embodiments, including non-electric vehicle embodiments, system battery 61 may be a typical starting, lighting, ignition (SLI) battery coupled to an alternator 46.

FIG. 1 shows one cylinder 14 of a multi-cylinder engine 10, which, in one example, may be a V6 engine. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Vehicle 5 may further include a brake pedal (not shown in FIG. 1), configured to communicate a desired slowing of vehicle speed by actuation of vehicle brakes. The brake pedal may be similarly monitored by a pedal position sensor.

Cylinder (herein, also "combustion chamber") 14 of engine 10 may include combustion chamber walls 136 with a piston 138 positioned therein. Pressure within the combustion chamber 14 may be determined via a cylinder pressure sensor 115 coupled to the combustion chamber 14. In one example, the cylinder pressure sensor 115 may be a piezoelectric sensor positioned in a cylinder head of cylinder 14. In another example, the cylinder pressure sensor 115 may be integrated with, e.g., forming a single unit with, a spark plug 192 of cylinder 14. Piston 138 may be coupled to a crankshaft 140 so that reciprocating motion of the piston is translated into rotational motion of the crankshaft. A position of the crankshaft 140 may be determined via a Hall effect sensor (crankshaft signal sensor) 120 coupled to the crankshaft 140. The crankshaft 140 may be coupled to at least one vehicle wheel 55 via a transmission 54, as further described below.

A starting device may be coupled to the crankshaft 140, via a flywheel and a coupling mechanism, such as a belt (not shown), for example, to enable cranking of engine 10. The starting device may be used to start the engine, e.g., rotate the crankshaft 140 and thereby drive piston motion, from a stationary status. In one example, when vehicle 5 is a conventional ICE vehicle, the starting device may be a conventional starter motor 171 which may be powered by system battery 61. When engine start (or restart following an idle-stop as described herein) is requested, the starter motor 171 may be energized by the system battery 61 to drive rotation of the crankshaft 140. Fuel combustion at cylinder 14 may commence after the engine is cranked by the starter motor 171 and the starter motor 171 may be deactivated once fuel combustion provides sufficient torque and rotation of the crankshaft is thereby driven by combustion.

The starter motor 171 may be electrically coupled to alternator 46 which may be configured to charge system battery 61 using engine torque via crankshaft 140 during engine operation. In addition, alternator 46 may power one or more electrical systems of the engine, such as one or more auxiliary systems, including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 and the starter motor 171 in order to regulate the power output of the alternator based on system usage requirements, including auxiliary system demands.

In other examples, the starting device may be an integrated starter-alternator or integrated starter-generator (ISG), which may be used in hybrid vehicles to provide boost, energy recovery, and enable implementation of start/stop technology. For example, electric machine 52 may be implemented as an ISG and may be coupled to and decoupled from engine 10 by the first clutch 53. In another example, the starting device may be a belt-driven integrated starter-generator (BISG) which may also be engaged/disengaged from engine 10 by the first clutch 53. For example, electric machine 52 may instead be implemented as a BISG where the BISG is located at a side of engine 10, e.g., a front side, and directly coupled to engine 10 by a belt drive. Both the ISG and the BISG may draw electrical energy from system battery 61 to provide torque to crank the engine during engine startup and restart conditions. During other conditions, the ISG or BISG may be operated in the generating mode to charge system battery 61 using excess engine torque.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an intake actuator 152. Similarly, exhaust valve 156 may be controlled by controller 12 via an actuator 154. The positions of intake valve 150 and exhaust valve 156 may be determined by respective valve position sensors (not shown).

An exhaust manifold 148 can receive exhaust gases from other cylinders of engine 10 in addition to cylinder 14. An exhaust gas sensor 126 is shown coupled to exhaust manifold 148 upstream of an aftertreatment device 70. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor. Aftertreatment device 70 may be a three-way catalyst, a NOx trap, various other emission control devices, or combinations thereof. In the example of FIG. 1, aftertreatment device 70 is a three-way catalyst.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from the engine, and exhaust turbine 176 may be optionally omitted. In still other examples, engine 10 may be provided with an electric supercharger (e.g., an "eBooster"), and compressor 174 may be driven by an electric motor.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

During operation, each cylinder within engine 10 typically undergoes a four stroke cycle which includes the intake stroke, compression stroke, expansion (herein, also "power") stroke, and exhaust stroke. During the intake stroke, generally, the exhaust valve 156 closes and intake valve 150 are open. Air is introduced into combustion chamber 14 via intake manifold 146, and piston 138 moves to the bottom of the cylinder so as to increase the volume within combustion chamber 14. The position at which piston 138 is near the bottom of the cylinder and at the end of its stroke (e.g. when combustion chamber 14 is at its largest volume) is referred to by those of skill in the art as bottom dead center (BDC).

During the compression stroke, intake valve 150 and exhaust valve 156 are closed. Piston 138 moves toward the cylinder head so as to compress the air within combustion chamber 14. The point at which piston 138 is at the end of its stroke and closest to the cylinder head (e.g. when combustion chamber 14 is at its smallest volume) is referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 192, resulting in combustion.

During the expansion (power) stroke, the expanding gases push piston 138 back to BDC. Crankshaft 140 converts piston movement into a rotational torque of the rotary shaft. Finally, during the exhaust stroke, the exhaust valve 156 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

During some conditions, controller 12 may vary the signals provided to actuators 152 and 154 to control the opening and closing of the respective intake and exhaust valves. For example, valve actuators may be a cam actuation type and the intake and exhaust valve timing may be controlled concurrently, and any of a possibility of variable intake cam timing, variable exhaust cam timing, dual independent variable cam timing, or fixed cam timing may be used in conjunction with multiple cam profiles or oscillating cams. In some examples, the cam actuation system may be a single cam and may utilize one or more of cam profile switching (CPS), variable cam timing (VCT), variable valve timing (VVT), and/or variable valve lift (VVL) systems that may be operated by controller 12 to vary valve operation. In yet other examples, a camless system may be used and the actuators 152, 154 may be electronically controlled. For example, the valves may be electro-pneumatic valves, electro-hydraulic valves, or electromagnetic valves.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples, the compression ratio may be increased when different fuels are used. This may happen, for example, when higher octane fuels or fuels with a higher latent enthalpy of vaporization are used. The compression ratio may also be increased if direct injection is used due to its effect on engine knock.

Each cylinder of engine 10 may include spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed and engine load, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal FPW received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

In an alternate example, fuel injector 166 may be arranged in an intake passage rather than coupled directly to cylinder 14 in a configuration that provides what is known as port injection of fuel (hereafter also referred to as "PFI") into an intake port upstream of cylinder 14. In yet other examples, cylinder 14 may include multiple injectors, which may be configured as direct fuel injectors, port fuel injectors, or a combination thereof. As such, it should be appreciated that the fuel systems described herein should not be limited by the particular fuel injector configurations described herein by way of example.

Fuel injector 166 may be configured to receive different fuels from fuel system 8 in varying relative amounts as a fuel mixture and may be further configured to inject this fuel mixture directly into cylinder 14. Further, fuel may be delivered to cylinder 14 during different strokes of a single cycle of the cylinder. For example, directly injected fuel may be delivered at least partially during a previous exhaust stroke, during an intake stroke, and/or during a compression stroke. As such, for a single combustion event, one or multiple injections of fuel may be performed per cycle. The multiple injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12, which may include a powertrain control module (PCM), is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; a cylinder pressure (CP) from a cylinder pressure sensor 115; an engine coolant temperature (ECT) from a temperature sensor 116 coupled to a cooling sleeve 118; an exhaust gas temperature from a temperature sensor 158 coupled to exhaust passage 135; a profile ignition pickup signal (PIP) from a Hall effect sensor 120 (or other type) coupled to crankshaft 140; a throttle position signal (TP) from a throttle position sensor; signal UEGO from exhaust gas sensor 126, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of aftertreatment device 70 based on the signal received from temperature sensor 158.

Controller 12 receives signals from the various sensors of FIG. 1, processes the received signals, and employs the various actuators of FIG. 1 (e.g., fuel injector 166 and spark plug 192) to adjust engine operation based on the received signals and instructions stored on a memory of the controller. In one example, in response to a lower than threshold engine load for a longer than threshold duration, the controller may initiate an engine idle-stop by sending a signal to the fuel injectors 166 to suspend engine cylinder fuel injection. In another example, in response to a request for engine restart, the controller may send a signal to an actuator of the starting device to activate the starting device. Further in response to the request for engine restart, a spark ignition timing may be adjusted according to an estimated fuel-air equivalence ratio (phi) and an estimated cylinder turbulence to enable fuel combustion during a power stroke of one or more cylinders, thereby reducing a load on the starting device.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

During conditions when the operator torque demand decreases to below a threshold torque demand, such as when the vehicle is stopped at a traffic signal, the engine may idle until the torque demand increases. However, prolonged idling may adversely affect fuel economy and emissions quality. To address this issue, an automatic start-stop operation may be carried out to reduce the duration of engine idling. For example, if it is determined that the engine has been idling for longer than a threshold duration, combustion may be suspended, and engine operation may be stopped (i.e., idle-stop) without manual input, e.g., by keying off an ignition, pressing a dashboard button, pressing a key fob button, etc. By adjusting the engine to an idle-stop mode, less fuel is consumed and emissions are reduced. When the idle-stop event is terminated, e.g., by a request for increased vehicle speed, etc., the engine may be restarted (i.e., idle-start) and combustion may be resumed.

Frequent use of the conventional start-stop method may result in shortened lifetime of a starting device. Starting devices designed primarily for initial engine starts have a finite use capacity and frequent demand on these devices for idle-starts after an automatic idle-stop may rapidly deplete the use capacity of the starting devices. For example, when the engine is restarted based on a similar fuel injection and spark ignition timing used to obtain peak power from cylinder combustion, the engine is first cranked by the starting device to build angular momentum at the engine until engine motion can be driven by combustion. Thus, a high load may be imposed on the starting devices and an undesirable amount of electrical energy may be consumed during engine restart. Restart demand on the starting device may be partially relieved by using expansion combustion (EC) to restart a warm, stabilized engine, thereby reducing a burden on the starting device and prolonging its useful lifetime.

Expansion combustion (EC) is the fueling and sparking of a cylinder during the power or expansion stroke when the engine is restarted. This combustion strategy provides torque assist to the starting device, such as a starter motor, ISG, or BISG, by enabling expansion of combusted gases to drive piston motion from near TDC to BDC, thus supplementing torque delivered by the starting device and allowing the starting device to operate at less than peak power. For engine restarts that use EC, combustion efficiency and restart efficiency may be increased while a reliance on external hardware, such as the starting device, is reduced.

In one example, prior to engine restart, EC may be implemented by selecting a cylinder based on a position of the stopped engine and combustion may be initiated in the selected cylinder by injecting fuel and then initiating a spark therein. The selected cylinder may be one that is stopped in a power stroke with a piston position within the selected cylinder being proximal to a top dead center (TDC) position relative to a cylinder head. In one example, the selected cylinder may be positioned at or near 60 degrees after top dead center (ATDC) when the engine is stopped. For example, the cylinder may be positioned within 5 degrees of 60 degrees ATDC, e.g., between 55 and 65 degrees ATDC. This cylinder position may result in more efficient EC compared to EC when the cylinder is closer to TDC, as the cylinder at or near 60 degrees ATDC may experience less resistance from the engine as the cylinder approaches BDC. Selection of the cylinder at or near 60 degrees ATDC may be performed after the engine begins rotating or when the cylinder is stopped during a compression stroke when the engine is stopped.

In another example, a cylinder is selected regardless of the stopped position and the starting device may crank the unsparked engine until the cylinder position reaches a target position suitable for EC, such as 60 degrees ATDC. Fuel may be injected at the cylinder prior to the cylinder reaching the target position. The selected cylinder is then sparked, resulting in expansion of combusted gases driving piston motion and supplementing torque delivered by the starting device.

However, EC may experience combustion issues. In one example, EC efficiency may be low due to a non-ideal spark ignition timing and low cylinder turbulence when the engine is stopped. Fueling and sparking of the cylinder may be initiated upon restart following a timing similar to a timing optimized for peak power generation but poor combustion efficiency may arise from insufficient mixing of injected fuel and air within the cylinder. This may result in unstable combustion, increasing a likelihood of misfire and producing a weak torque output which may lead to increased fuel consumption and/or dependency on the starter motor to restart the engine, at least partially offsetting the benefits of EC.

The low efficiency of EC due to non-ideal spark ignition timing and low cylinder turbulence may be at least partially addressed by real-time prediction of spark ignition timing. Without detracting from any EC benefits, combustion may be stabilized by adjusting the spark ignition timing based on current engine conditions, including a fuel-air equivalence ratio (e.g., phi) and cylinder turbulence.

Phi is the ratio of the actual fuel-air ratio within the combustion chamber to the stoichiometric fuel-air ratio, at which complete combustion occurs. This fuel-air equivalence ratio is independent of both air/fuel mass and molar value. Phi values greater than one indicate rich mixtures, e.g., excess fuel relative to available oxygen. Phi values less than one indicate lean mixtures, e.g., excess oxygen relative to combustible fuel. When phi is equal to one, the actual fuel-air ratio is equivalent to the stoichiometric fuel-air ratio. The stoichiometric fuel-air ratio, resulting in complete combustion, may provide maximum torque upon combustion. However, variations in operating conditions may lead to preferential enrichment or enleanment of the air/fuel mixture. For example, when rapid, high power output is demanded, such as during an engine restart, a rich mixture may be desirable.

Power derivation from combustion may also depend on turbulence, or air movement within the cylinder. Turbulence causes air and fuel to mix, increasing a likelihood of achieving a homogeneous mixture throughout the combustion chamber. Turbulence may increase in the cylinder during an intake stroke where air is drawn into the cylinder through one or more intake valves. However, during the compression and power strokes, both the intake valves and exhaust valves are closed. Thus, turbulence in the cylinder may predominantly arise from fuel injection during strokes where the valves are closed and may be comparatively low, particularly after the engine has been idle-stopped for a period of time. Furthermore, when the cylinder piston is stopped, even for a short period of time, no turbulence is generated from piston motion.

Turbulence induced by fuel injection during EC may cause mixing of fuel with air in the cylinder over a different duration of time following the fuel injection relative to non-EC conditions. At a certain moment in time, or a certain interval of time, subsequent to the fuel injection during EC, conditions at a spark plug of the cylinder may be briefly optimized for stable combustion where the conditions include both a rich mixture and (relatively) high turbulence. A time for optimal spark ignition combustion may be predicted based on parameters such as the piston position, an amount of fuel injected, an engine temperature, a barometric pressure, etc. Upon achievement of ideal phi and turbulence, the controller may send a command to initiate a spark in the selected engine cylinder. When EC is executed in one or more cylinders, spark timing may be adjusted based on the estimated phi and cylinder turbulence to achieve a maximum amount of torque deliverable by EC. The adjusted spark timing may provide increased torque assist to reduce the load on the starting device which may be operated at a lower peak current and/or deactivated earlier compared to restarting the engine solely by the starting device.

In this way, the system of FIG. 1 enables a method for an engine comprising: prior to an engine restart following an idle-stop; adjusting a spark ignition timing based on an estimation of a fuel-air equivalence ratio in a cylinder and an estimation of a cylinder turbulence.

Turning to FIG. 2, it shows a graph 200 depicting an estimated time trace for a fuel-air equivalence ratio (phi) in a cylinder during an engine restart following an engine idle-stop. The horizontal (x-axis) denotes time in milliseconds and the vertical (y-axis) denotes phi at a spark plug, e.g., spark plug 192 of FIG. 1. The time trace shown in graph 200 may represent variations in phi when the cylinder is selected to execute EC upon engine restart. For example, fuel may be injected into the cylinder at 60 degrees ATDC, where plot 202 shows a change in phi at the spark plug after the fuel is injected. Line 201 shows a threshold value of phi equal to one, above which phi represents a rich mixture and below which phi represents a lean mixture. Plot 202 may be estimated based on sensor data input, including one or more of an engine temperature, a barometric pressure, a fuel rail pressure, an air-to-fuel ratio determine prior to the engine idle-stop, an engine position, an injector orientation, and a number of fuel injections to update the estimation of the fuel-air equivalence ratio.

Initially, phi is at zero immediately following fuel injection due to a period of time for the fuel to mix with air and reach the spark plug. As the fuel mixes due to turbulence generated by the injection event, a rich pocket is formed around the spark plug at a first point in time, t1, as indicated by a rapid increase in phi. High turbulence in the combustion chamber, as shown in FIG. 3 and described further below, may result in more thorough mixing of air and injected fuel, and the phi value decreases with time as fuel evenly disperses throughout the cylinder. Between the first point t1 and a second point in time, t2, phi represents a rich mixture and may be at an optimal fuel-air ratio for EC sparking.

FIG. 3 shows a graph 300 depicting a time trace of turbulence within a selected cylinder, e.g., the cylinder of FIG. 2, during an engine restart following an engine idle-stop. The horizontal (x-axis) denotes time in milliseconds. The vertical (y-axis) denotes a turbulence kinetic energy (TKE), when the engine is fueled at 60 degrees ATDC, in $m^2/s^2$. Plot 302 shows a change in turbulence within the selected cylinder over time. Graph 300 may be estimated based on sensor data input, including one or more of an engine temperature, a barometric pressure, a fuel rail pressure, an air-to-fuel ratio, an engine position, an injector orientation, and a number of fuel injections.

Upon conditions being met for engine restart, fuel is injected at the selected cylinder when the cylinder is at 60 degrees ATDC. Fuel injection may be a primary source of turbulence within the selected cylinder during EC, leading to a spike in turbulence soon after fuel injection, as shown at plot 302. The spike in turbulence may occur between a first time point t1 and a second time point t2 equivalent to t1 and t2 of FIG. 2. Thus a period of enrichment of the fuel/air mixture at the spark plug overlap with the spike in turbulence, providing optimal combustion conditions at the spark plug. As time increases, the turbulence dissipates.

By initiating spark during an interval where phi indicates a rich mixture at the spark plug and cylinder turbulence is high, the injected fuel may mix more thoroughly with air, resulting in conditions that promote stable combustion. For example, the conditions may increase a likelihood that a continuous flame front is generated. Furthermore, the spark timing may be updated in real-time based on detected changes in the sensor data input, allowing the spark timing to be robustly predicted during each engine restart following an idle-stop.

FIG. 4 shows a set of graphs 400 of variations in cylinder pressure, an estimated torque at an engine, e.g., at a crankshaft of the engine, and engine speed, depicted as a first graph 402, a second graph 404, and a third graph 406, respectively, during an engine restart following an engine idle-stop. In one example, the engine idle-stop and restart may be implemented in a vehicle such as vehicle 5 of FIG. 1. The horizontal (x-axis) denotes time and the vertical markers t0-t4 identify significant times in the restart process. Each of the cylinder pressure, estimated torque, and engine speed increase upwards along the y-axis.

The first graph 402 shows cylinder pressure as measured by a pressure sensor, such as sensor 115 of FIG. 1. Plot 410 of the first graph 402 depicts pressure within a first cylinder at which combustion occurs when engine restart is requested. The first cylinder may be configured to perform EC (hereafter, EC cylinder 1). A spark timing during an initial power stroke of EC cylinder 1 may be adjusted based on an estimated phi and estimated cylinder turbulence, as described above with reference to FIGS. 2 and 3. Plot 412 depicts pressure within a second cylinder of a firing order of the engine. Expansion combustion is also performed at the second cylinder (hereafter, EC cylinder 2). Plot 414 shows pressure within a third cylinder (hereafter, cylinder 3) to undergo combustion upon engine restart. In one example, cylinder 3 undergoes nominal combustion, e.g., a fuel injection and a spark ignition timing configured to generate peak power from the cylinder. During interval 401, a first engine cycle occurs (e.g., EC cylinders 1 and 2 cycle through expansion and exhaust strokes, and cylinder 3 cycles through intake, compression, expansion, and exhaust strokes). A second engine cycle occurs during interval 403 and a third engine cycle occurs during interval 405. It will be appreciated that only three cylinders are illustrated for brevity and various quantities of cylinders may be included in the engine.

Between t0 and t1, the engine is idle-stopped. Cylinder pressure (in all cylinders) is low due to an idling state of the engine prior to stopping, where a throttle in an intake system of the engine is closed and air flow into the cylinders is reduced. Estimated torque and engine speed are both low due to engine idle-stop.

At t1, in response to an engine start request, the starting device is engaged and activated. The starting device cranks the unfueled, unsparked engine, resulting in an increase in estimated torque, as shown by plot 404. EC cylinder 1 may be adjusted by the starting device to a target position, such as 60 degrees ATDC. Engine speed generated by cranking via the starting device is negligible at this point. Fuel may be injected at the cylinder during a period of time between initially cranking the engine and EC cylinder 1 reaching the target position.

At t2, combustion occurs in EC cylinder 1 when the cylinder has reached the target position suitable for EC. Ignition timing is determined and adjusted based on estimated phi and cylinder turbulence, as shown in FIGS. 2 and 3, respectively. Cylinder pressure rises in EC cylinder 1 due to expansion of ignited air and fuel, as shown by plot 410.

Between t2 and t3, estimated torque is relatively uniform, as shown by graph 404. Supplemental torque is provided by EC which assists in driving engine rotation. The torque assistance may reduce a demand on the starting device. Starting device torque contribution may be proportionally reduced so that net torque remains constant. In one example, EC torque contribution may drive an increase engine speed, as shown by graph 406. As a result, the starting device may be deactivated. Engine speed rises due to torque provided by EC at EC cylinder 1. Furthermore, pressure within EC cylinder 1 decreases as cylinder volume increases during the expansion stroke and dissipates as EC cylinder 1 enters an exhaust stroke. EC cylinder 2 cycles through an intake stroke, resulting in cylinder pressure increase as shown by plot 412.

At t3, EC cylinder 2 reaches the target position suitable for EC. Fuel injection and ignition timing are determined based on estimated phi and cylinder turbulence, as shown in FIGS. 2 and 3, respectively. Cylinder pressure rises in EC cylinder 2 due to expansion of ignited air and fuel.

Between t3 and t4, pressure within EC cylinder 2 peaks and then decreases as combustion chamber volume increases during the expansion stroke and continues to decrease during a subsequent exhaust stroke. Cylinder 3 cycles through an intake stroke, resulting in cylinder pressure increase as shown by plot 414. Engine speed continues to increase due to torque provided by EC in EC cylinder 2 and buildup of momentum.

At t4, the engine reaches a threshold speed, e.g., an idling speed, and combustion is adjusted to a nominal timing. The nominal timing may be, for example, a fuel injection and ignition timing optimized for peak combustion power with the timings occurring earlier, with respect to crank angle, than during EC. Cylinder 3 undergoes nominal combustion and peak pressure at cylinder 3, as shown in plot 414, is higher than the peak pressures of EC cylinders 1 and 2 during the first engine cycle. The higher peak pressure of cylinder 3 may correspond to greater air flow into the cylinder due to opening of the throttle as a torque demand increases, resulting in injection of more fuel and therefore greater mass of combusted gases. It will be noted that the peak pressure of cylinder 3 is beyond the scale of the y-axis in plot 414.

Between the first interval 401 and the second interval 403, remaining cylinders of the engine fire at the nominal timing. Engine speed increases above the idling speed, which may correspond to an increase in vehicle speed as requested by an operator. After t4, the vehicle speed reaches a desired speed and the operator may reduce the torque demand, e.g., by decreasing pressure on an accelerator pedal. In addition, combustion is nominal at all cylinders after t4. Cylinder pressure during the second and third intervals 403, 405, is lower compared to the peak pressure of cylinder 3 during the first interval 401 due to the reduced torque demand, which may decrease an opening of the throttle, thereby reducing air flow to the cylinders.

Figure 5A:
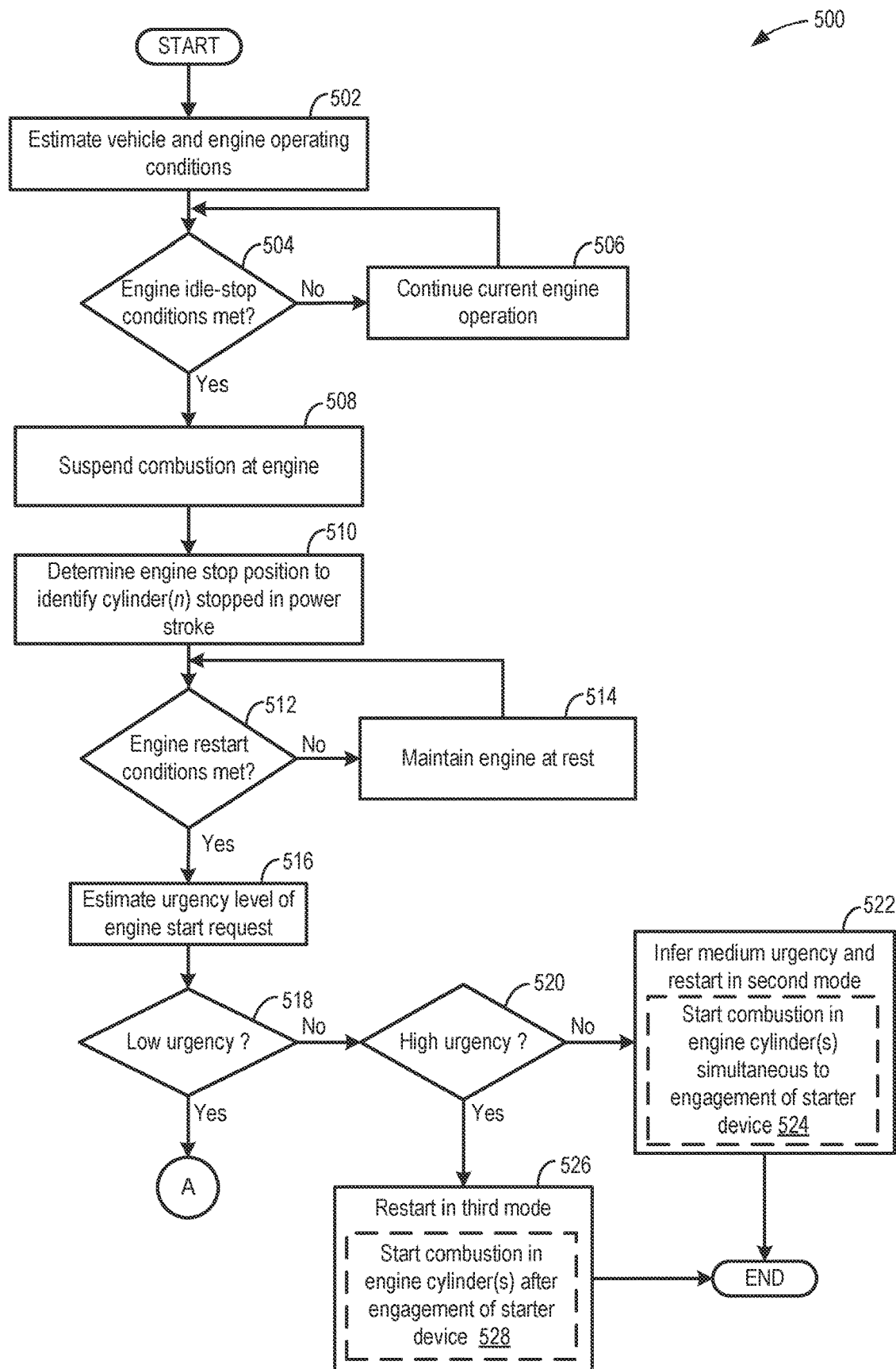
FIGS. 5A and 5B show an example method for restarting an engine following an idle-stop.
Figure 5B:
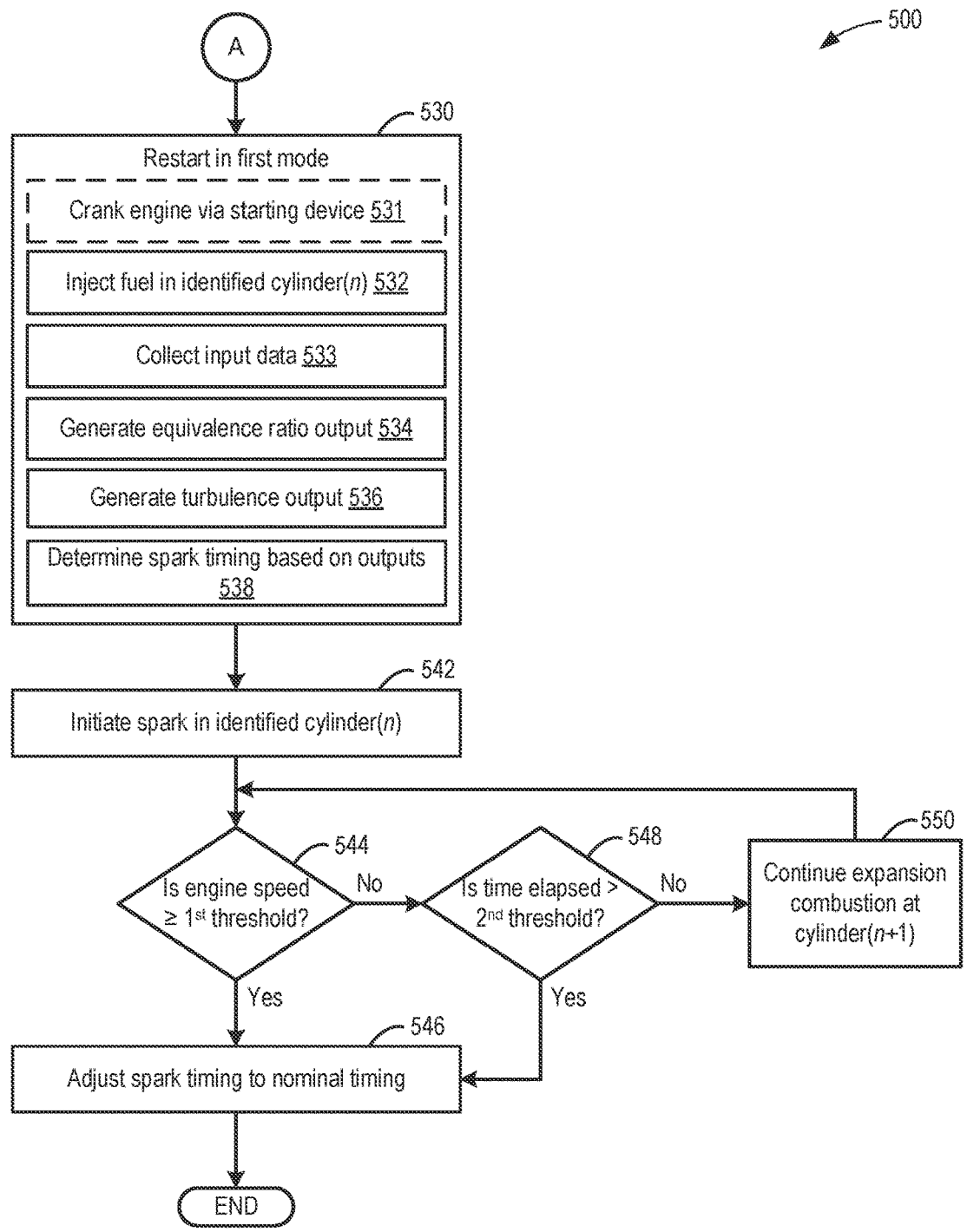
Figure 6:
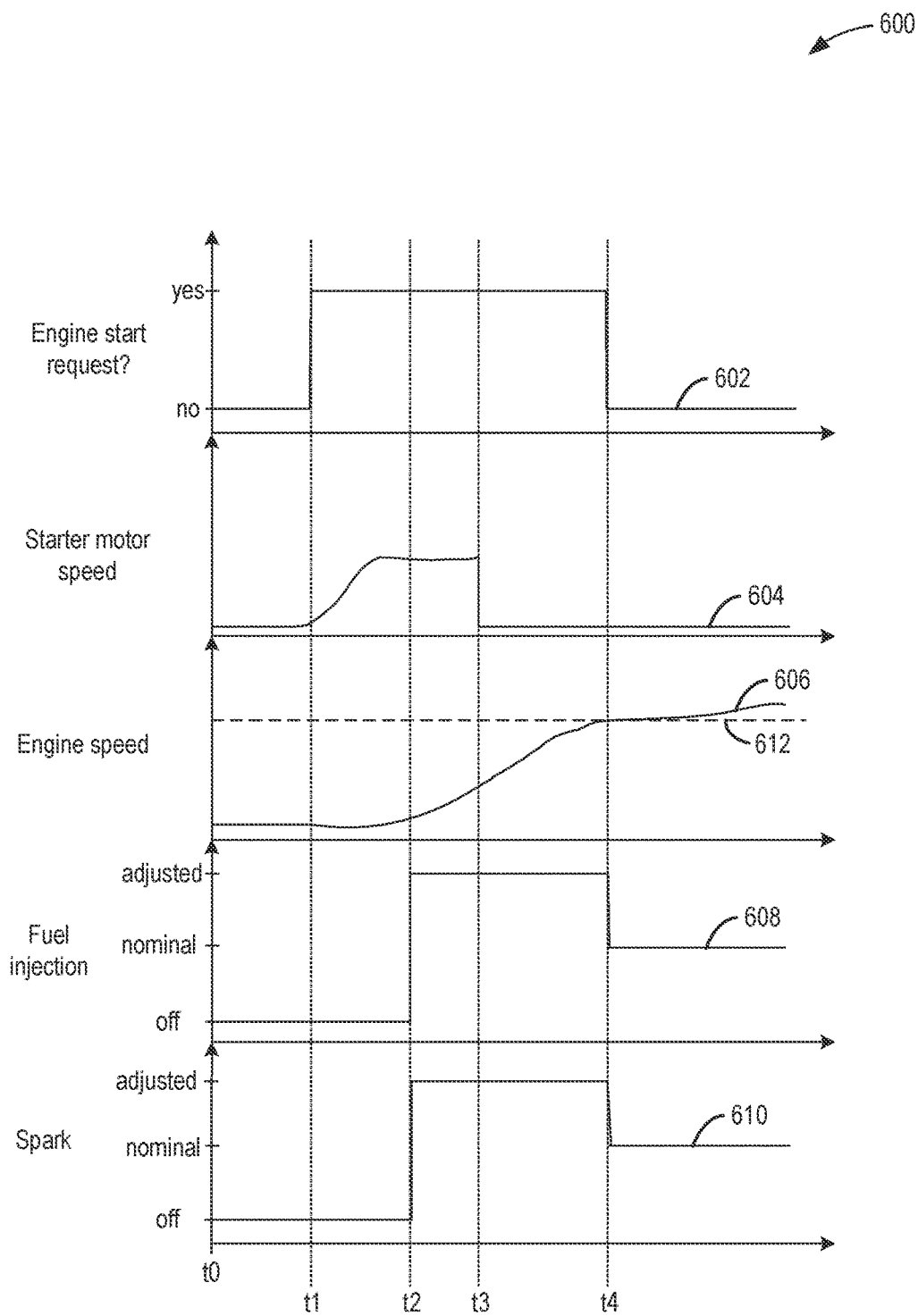
FIG. 6 is a timing diagram that shows variations in engine operations and conditions during the engine restart following the idle-stop.

FIGS. 5A and 5B show an example method 500 for restarting an engine following an engine idle-stop. As an example, the engine may be configured as a V6 engine where each cylinder is cycled at a different timing, staggered from adjacent cylinders. The engine may include a starting device, such as a starter motor, an ISB, or a BISG, as described above with reference to FIG. 1, to crank the engine upon startup. The starting device may be powered by an electrical storage device, such as a battery, and coupled/decoupled from the engine by a mechanism such as a clutch. Instructions for carrying out method 500 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below. For example, an ignition system may provide spark to a combustion chamber via a spark plug in response to a spark advance signal SA from the controller, under select operating modes.

At 502, current vehicle and engine operating conditions may be estimated and/or measured. These may include, for example, operator torque demand, engine speed, vehicle speed, engine coolant temperature (ECT), engine head temperature (EHT), engine load, ambient conditions (such as ambient humidity, temperature, and barometric pressure), exhaust temperature, manifold pressure, manifold air flow, battery state of charge, crankshaft position, fuel rail pressure, a status of a fuel injector, etc.

At 504, the routine includes determining if engine idle-stop conditions are met and if an engine spin-down may be initiated. Conditions for engine idle-stop may include engine idling for a longer than threshold duration. For example, engine idling may take place while the vehicle is at a traffic stop when the engine load is below a threshold load (such as when the vehicle is stationary). Engine operation at the idling speed for a longer than threshold duration may result in increased fuel usage and increased level of exhaust emissions.

Engine idle-stop conditions may also depend on battery state of charge (SOC). The controller may check battery SOC against a preset minimum threshold charge and if it is determined that the battery SOC is at least more than the minimum threshold of charge, automatic engine stop may be enabled. For example, the minimum threshold may be a SOC of at least 30%. If the SOC is below the minimum threshold of charge, the battery may not be able to power the starting device or support electrical loads while powering the starting device. Confirming engine idle-stop conditions may further include receiving an indication from controller 12 that the starting device is operation ready. The status of an air conditioner may be checked and, before initiating an engine idle-stop, it may be verified that the air conditioner did not issue a request for restarting the engine, as may be requested if air conditioning is desired. The intake air temperature may be estimated and/or measured to determine if it is within a selected temperature range. In one example, the intake temperature may be estimated via a temperature sensor located in the intake manifold and an engine idle-stop may be initiated when the intake air temperature is above a threshold temperature. Also, the engine temperature may be estimated and/or measured to determine if it is within a selected temperature range. In one example, the engine temperature may be inferred from an engine coolant temperature and an engine idle-stop may be initiated when the engine coolant temperature is above a threshold engine temperature. The driver requested torque may be estimated and confirmation of an engine idle-stop may be initiated in response to a lower than threshold driver requested torque. The vehicle speed may be estimated and assessed whether it is below a predetermined threshold speed. For example, if the vehicle speed is lower than a threshold speed (e.g., 3 mph) an engine idle-stop may be requested even if the vehicle is not at rest.

If it is determined that engine idle-stop conditions are not met, at 506, current engine operations may be continued without initiating the engine start-stop operation such as the engine may be maintained running with cylinders combusting fuel. If it is confirmed that engine idle-stop conditions are met, at 508, combustion may be suspended to idle-stop the engine. In order to suspend combustion, fueling to the engine cylinders may be halted. The controller may send a signal to one or more fuel injectors coupled to the engine cylinders to stop fuel injection to each of the cylinders. In addition, the controller may send a signal to a spark plug coupled to each cylinder to disable spark. Once the combustion is suspended, the engine may spin-down and the engine speed may gradually decrease to zero. The engine may be maintained at rest until restart conditions are met.

At 510, an engine stop position may be determined to identify a cylinder stopped in a power (expansion) stroke. When the engine stops spinning, each cylinder may be stopped (parked) at a distinct position. As an example, in a V6 engine with six cylinders, each cylinder may operate at a different timing from the other cylinders. In other words, the timing of the cylinders may be staggered. In some examples, the cylinder timing may adhere to a pattern, such as synchronized timing of cylinder pairs. As an example, a first and a fourth cylinder may be cycled in unison, a second and a fifth cylinder may be cycled in unison, and a third and a sixth cylinder may be cycled in unison. Various timing patterns are possible and depending on a timing of the engine, one or more cylinders may be in the power stroke when the engine is stopped. When in the power stroke, a piston of each of the one or more cylinders is close to or at its TDC position with the piston proximal to the cylinder head and each cylinder valve (e.g., intake and exhaust valves) closed. In one example, one or more cylinders closest to 60 degrees ATDC may be identified for engine restart. When a combustion event occurs in the one or more cylinders, the cylinder pressure is confined within a closed system and increases as combustion gases expand.

Alternatively, in some examples, when the engine idle-stop conditions are met, the engine may be stopped when a target cylinder (or cylinders) is at the power stroke. In one example, the engine may be stopped when the target cylinder reaches 60 degrees ATDC. The position of the cylinder piston may be determined based on a signal from a crankshaft sensor (e.g., the crankshaft/Hall effect sensor 120 of FIG. 1) from which a piston position may be inferred. In yet other examples, as shown in FIG. 4, the engine may be idle-stopped at any position and adjusted to a desired position upon engine restart.

At 512, the method includes confirming if engine restart conditions are met. In one example, engine restart conditions following the engine idle-stop may include an increase in engine load. In one example, the controller may determine if a brake pedal is released. An accelerator pedal position may also be determined, e.g., via a pedal position sensor, to determine whether the accelerator pedal has been engaged as the brake pedal is released. The status of the air conditioner may be checked to verify whether a request has been made to restart the engine, as may be made when air conditioning is desired. The SOC of the battery may be estimated to determine if it is below a predetermined threshold charge. In one example, it may be desired that battery be at least 30% charged. Accordingly, engine restarting may be requested to charge the battery to a desired value.

The engine restart conditions may further include a request from an emission control device to restart the engine. In one example, the emission control device temperature may be estimated and/or measured by a temperature sensor, and if the temperature is below a predetermined threshold temperature, e.g., a light-off temperature, an engine restart may be requested. As another example, the vehicle speed may be estimated and assessed for whether it is above a predetermined threshold speed. For example, if the vehicle speed is greater than the predetermined threshold speed (e.g., 3 mph) an engine start may be requested. The engine restart conditions may also be determined based on whether an electrical load of the engine is above a predetermined threshold load, in response to which an engine start may be requested (e.g., to reduce draining of the battery). In one example, the electrical load may arise from operation of user-operated accessory devices, electrically powered air-conditioning, etc.

If it is determined that the engine start conditions have not been met, at 514, the engine may be maintained in the stopped condition, and combustion may not be resumed. If it is determined that engine restart conditions are met, the method proceeds to determine a mode of restart for the engine at 516. The mode of engine restart may include an order of initiation of combustion and engagement of the starting device to crank the engine in response to one or more conditions for engine restart being met. The engine may be automatically started in a mode selected according to an urgency level for the engine start that is determined from vehicle operating conditions. The urgency level may be a low urgency, a medium urgency or a high urgency, corresponding to a first mode, a second mode, and third mode of engine restart, respectively. For low urgency engine starts, the engine may be started such that the energy to start the engine may be reduced as compared to engine starts that are determined to be of medium or high urgency. For high urgency engine starts, maximum torque capacity of the starting device and of the engine may be requested so that driver demand torque may be met in a timely manner.

The urgency of an engine start may be estimated based on a function of driver torque demand with the level of urgency increasing (from low urgency to medium urgency and then to high urgency) with an increase in driver torque demand. As one example, the engine start urgency is estimated to be high based on the engine start being requested in response to the driver demand exceeding a threshold demand such as based on an accelerator pedal tip-in (high accelerator pedal position). The urgency may also be estimated to be high if it is determined that the starting device has insufficient torque to start the engine and provide the requested driver demand torque at a predetermined time in the future (e.g., 0.5 seconds after the engine restart request). As another example, if a system component such as an on-board climate control system is the originator of a signal that is the basis for the engine start request, then the engine start urgency may be determined to be lower urgency. In yet another example, some vehicle devices that are the basis for the engine start request may be the basis for adjusting engine starting urgency to a medium level. For example, an engine exhaust system temperature monitor that is the basis for an engine start request may be deemed to warrant low engine start urgency. Conversely, a significant change in battery state of charge in a short time period may be deemed to warrant a medium engine start urgency level. As another example, if the originator of a signal that is a basis for the engine start request is a human operator with the driver torque demand not exceeding the threshold demand, then the engine start urgency may be deemed medium. Engine start urgency levels may be assessed according to the originator of the engine start request as well as rates of change of vehicle operating parameters (e.g., battery state of charge).

At 518, the method includes confirming if the urgency of the engine restart is low. If the urgency is not low, the method continues to 520 to determine if the engine restart urgency is high. If it is determined that the urgency level of the engine start is not high or low, at 522, it may be inferred that the urgency level of the engine restart request is medium. In response to an engine start request of medium urgency, the engine may be restarted in the second mode. Restarting the engine in the second mode may include at 524, initiating combustion in one or more engine cylinders while the starting device is engaged, e.g., coupled to the engine, and activated. After fuel injection, spark ignition timing may be adjusted such that combustion and engine cranking via the starting device may occur at the same time. Engine cranking via the starting device may be continued until the engine speed reaches a threshold speed, such as the engine idling speed.

If, at 520, it is determined that the urgency level of the engine start is high, the engine may be restarted in the third mode at 526. Restarting the engine in the third mode may include, at 528, starting combustion in one or more engine cylinders after engagement and activation of the starting device. The starting device may first be engaged to crank the engine and then after the engine is cranked for a threshold duration, e.g., 5 seconds, fueling and spark may be initiated in the engine cylinders to start combustion. By initiating engine cranking solely via the starting device, engine start may be expedited. A higher peak current of the starting device may be used to crank the engine without support from torque generated from combustion and a higher static friction is to be overcome, imposing a high load on the starting device.

Returning to 518, if the urgency of the engine restart is confirmed to be low, the method proceeds to 530, as shown in FIG. 5B, to restart the engine according to the first mode. For example, restarting the engine via the first mode may include, at 531, cranking the engine using the starting device. The starting device may draw electrical energy from the battery and rotate while coupled to the crankshaft, thereby driving piston motion. In some examples, however, torque provided by EC may be deemed sufficient to facilitate engine restart and 531 may instead be omitted if the engine is configured as a three-cylinder engine or if the engine is small.

Restarting the engine in the first mode may further include executing the fuel injection event at the identified cylinder(s) at 532. The fuel injection event may be executed, for example, when the starting device is engaged and cranking the engine and the engine speed reaches a predetermined threshold speed. As an example, as shown in FIG. 4, the starting device cranks the engine and continues rotating the engine until the torque output of the engine reaches a threshold torque such as 80 N·m of torque, that corresponds to the predetermined threshold speed. Upon reaching the predetermined threshold speed, engine speed may plateau, indicating that the fuel injection event is to be executed. The crankshaft position may be monitored to ensure that fuel is injected at timing that ensures that the selected time of spark ignition following the fuel injection event occurs during the power stroke of the identified cylinder(s).

The identified cylinder(s) may be a cylinder n where n is an integer value with respect to an order of cylinder firing. A cylinder that is subsequently fired is therefore n+1. In some examples, the fuel injection event may include a single injection from a fuel injector of the cylinder. In other examples, the fuel injection event may include injections from more than one fuel injector at a similar timing at the same cylinder. In yet other examples, the fuel injection event may include multiple injections from one or more fuel injectors of the cylinder.

For example, the fuel may be injected intermittently in bursts, e.g., multiple injections, from one fuel injector until a desired volume of fuel has been injected. In another example, the fuel may be injected intermittently in an alternating pattern from more than one fuel injector coupled to the cylinder. Various injection strategies are possible, depending on a configuration of the cylinder and engine operating conditions. However, regardless of injection pattern, generation of the predicted spark ignition timing based on the estimated phi value and the estimated cylinder turbulence may determine variations in injection strategy. In other words, the injection strategy may be anticipated at each engine restart and the spark ignition timing may be continually updated based on the injection strategy when input into the look-up table described above. Variations in the fuel injection event may thereby be accounted for in the determination of spark ignition timing.

At 533, various input data may be collected and entered into the look-up table stored in the controller's memory. The input data may include sensor information regarding an engine temperature, ambient temperature, barometric pressure, a fuel rail pressure, an engine position, as well as manufacturer-provided information, such as an orientation of one or more fuel injectors at the identified cylinder(s), a number of anticipated injections during an upcoming fuel injection event, and/or a target AFR of the identified cylinder(s).

The look-up table, once the data is input, may be used to generate a fuel-air equivalence ratio (e.g., phi value) as an output at 534. The fuel-air equivalence ratio may be generated as a time trace, e.g., graph 200 of FIG. 2, following the fuel injection event, providing the predicted fuel-air equivalence ratio at the spark plug at the identified cylinder(s) with time, as shown at graph 200 of FIG. 2 and described above. A turbulence at the identified cylinder(s) may also be estimated at 536 as a time trace output, e.g., graph 300 of FIG. 3, following the fuel injection event at 532, providing predicted variations in cylinder turbulence with time, as shown at graph 300 of FIG. 3 and also described above.

Restarting the engine in the first mode may further include determining a period of overlap at 538, between when the phi value is above 1 (e.g., indicating a rich fuel-air mixture) and turbulence is above a threshold energy (such as above a turbulent kinetic energy of above 10 $m^2/s^2$ and selecting a point in time for initiating spark during the power stroke of the identified cylinder(s). The selected time for initiating spark may be a moment or an interval of time during which a rich phi value and high turbulence provide an optimal combination to produce a desired amount of torque. As such, the timing of spark ignition may be adjusted from a nominal timing (e.g., a timing used when the engine is operating and stable, such as initiating spark at or before TDC of the engine cylinders) to the selected time based on the predicted phi value and turbulence time traces.

The method includes initiating spark at the n cylinder at 542. Spark is ignited at the spark plug of the cylinder following the fuel injection event after an elapsed period of time based on the spark timing determined from the combination of the estimated phi value and the estimated cylinder turbulence. Upon initiating spark at the cylinder after the inferred period of time, the fuel-air mixture at the spark plug may be rich and turbulence may be high, thus increasing a likelihood that a continuous flame front is generated which may lead to stable combustion within the cylinder. When the fuel/air mixture combusts in the cylinder, expanding combustion gases drives the piston to BDC, thus producing an amount of torque that provides assistance directed to increasing an inertia of the engine and ramping up engine speed.

At 544, the method includes confirming if the engine speed reaches a first threshold engine speed. The first threshold engine speed may be a non-zero speed, e.g., greater than when the engine is shut down due to idle-stop conditions as described at 504. In one example, the first threshold engine speed may be the idling speed of the engine and when the engine reaches the idling speed, the starting device is deactivated and disengaged from the engine. For example, the first threshold engine speed may be an engine speed corresponding to a sufficient amount of angular momentum at the engine to continue engine rotation based on fuel combustion alone. By starting the engine using EC, the engine may reach the first threshold faster and with less energy expenditure than conventional methods of low urgency engine restart.

If the engine speed is at least equal to the first threshold engine speed, the method continues to 546 to adjust the spark timing to the nominal timing. As described above, the nominal timing may be an optimal spark ignition timing once the engine is started and the engine is able to accommodate changes in torque demand. For example, spark ignition may be advanced from a timing where spark ignition occurs after the cylinder is at 60 degrees ATDC, e.g., corresponding to the spark timing determined based on the estimated fuel-air equivalence ratio and the estimated turbulence, to a spark timing where spark ignition occurs before or when the cylinder piston reaches TDC. As the engine speed increases, the spark timing may be further advanced to maintain a high torque output. The method ends.

If the engine speed does not reach the first threshold engine speed at 544, the method proceeds to 548 to determine if an amount of time elapsed since the engine restart conditions were met exceeds a second threshold duration. The second threshold duration may be a period of time beyond which ramping the engine speed to at least the first threshold speed is deemed too long and may lead to user dissatisfaction. For example, the vehicle may be stopped at a traffic intersection, e.g., at a traffic light, and, after idling for the threshold duration, the engine is turned off. Upon observing a change at the traffic light, the user may indicate engine restart by requesting an increase in torque via accelerator pedal depression. If a period of time elapses, such as 5 seconds, before the engine is able to output enough torque to meet the torque demand, the user may become frustrated. As such, the second threshold duration may be set at a shorter duration, such as less than 1 second.

If the time elapsed reaches the second threshold duration, the method proceeds to 546 to adjust the spark timing to the nominal timing, regardless of the engine speed. In some examples, the starting device may be engaged and activated to increase the engine speed rapidly while initiating spark at the nominal timing. In this way, although the load on the starting device is increased, engine torque is provided faster than enabled by EC.

If the time elapsed does not reach the second threshold duration, the method proceeds to 550 to continue EC at a next cylinder according to a sequence of cylinder operation, e.g., an n+1 cylinder. For example, if the n cylinder is a first cylinder of a V6 engine, the n+1 is a second cylinder, offset in phase from the first cylinder by 60 degrees, as an example. The method returns to 544 to compare the engine speed to the first threshold speed.

A number of cylinders at which EC is executed may vary depending on engine configuration, operating conditions, an amount of torque generated by EC, etc. In some examples, EC at the first cylinder may be sufficient to ramp engine speed to the first threshold engine speed. In other examples, at least two EC cycles (e.g., EC at two sequential cylinders) may be demanded to reach the first threshold engine speed. In yet other examples, more than two EC cycles may be demanded to sufficiently increase engine speed. However, the number of EC cycles may be balanced by an amount of time elapsed (e.g., not to exceed the second threshold duration) in order to achieve the first threshold of engine speed.

Turning now to FIG. 6, it shows a graph 600 illustrating an example engine operating sequence of an engine restart following engine idle-stop. The engine operating sequence may be implemented in an engine system of a vehicle including an engine such as engine 10 of FIG. 1. The engine control system may be implemented in the PCM of a controller, such as controller 12 of FIG. 1, and may be configured to estimate a fuel-air equivalence ratio (e.g., phi) and a cylinder turbulence when engine restart is requested. For example, input data, as described above may be entered into a look-up table and time traces of phi and the cylinder turbulence may be output, as shown in FIGS. 2 and 3. Graph 600 includes a plot 602, illustrating if an engine start is requested, a plot 604 illustrating a starter motor speed to crank an engine from rest and adjust piston position, a plot 606 illustrating engine speed as estimated via a crankshaft position center, a plot 608 indicating fuel injection status, and a plot 610 indicating engine sparking status. Time increases along the x-axis from a left to a right side of the figure.

Plot 602 varies between yes and no along the y-axis. For plots 604 and 606, starter motor speed and engine speed, respectively, increase upwards along the y-axis. In addition, plot 606 includes a threshold speed 612. The threshold speed 612 may be a non-zero speed, e.g., greater than when the engine is shut down due to idle-stop conditions as described at 504 of FIG. 5A. In one example, the threshold may be the idling speed of the engine, during which the engine speed is sufficiently high to enable nominal spark ignition/combustion, e.g., a fuel injection and spark ignition timing adjusted to provide peak power. Plot 608 indicates if fuel injection is adjusted, nominal, or off, and plot 610 indicates if engine sparking is adjusted, nominal, or off where adjusted fuel injection and adjusted engine sparking refers to timing of each parameter modified to enable EC at the engine, as described above. For example, fuel may be adjusted to be injected after one or more cylinders are at TDC and sparking of the one or more cylinders occurs at time following the injection where the fuel-air mixture is predicted to be rich at a spark plug of each cylinder and cylinder turbulence is high.

At t0, prior to an engine start request (plot 602), the engine is idle-stopped without combustion, thus engine speed is low (plot 606) and the starter motor is off (plot 604). The engine is not fueled (plot 608) or sparked (plot 610).

At t1, an engine restart is requested. Due to the engine start request, the starter motor is activated and increases in speed, thereby cranking the engine, and driving an increase in the engine speed. By cranking the engine, the starter motor may also adjust a first cylinder, herein referred to as EC cylinder 1, to a target piston position enabling EC. In one example, the adjusted piston position for EC is 60 degrees ATDC. The engine remains unfueled and unsparked until t2.

At t2, EC cylinder 1 is adjusted to the target piston position and fuel is injected at the adjusted timing. Data required to estimate phi and turbulence is input from sensors into a table stored in the controller's memory. The data may include one or more of an engine temperature, a barometric pressure, a fuel rail pressure, an air-to-fuel ratio, an engine position, an injector orientation, and a number of fuel injections to update the estimation of the fuel-air equivalence ratio and the cylinder turbulence. Phi and cylinder turbulence are predicted based on input data and a timing for spark ignition determined based on an overlap between when phi is greater than one and when cylinder turbulence is above 5 $m^2/s^2$, for example.

Following fuel injection, spark is also initiated at t2 based on the adjusted timing, according to the phi and cylinder turbulence estimates, to ignite the air/fuel mixture in the cylinder. Between t1 and t2, the starter motor has reached a predetermined maximum speed and continues to operate at that speed. The maximum speed may be a speed corresponding to a reduced peak operating current of the starter motor relative to a peak operating current of the starter motor during engine restart relying exclusively on the starter motor (e.g., no EC assist). Engine speed continues to increase as combustion within EC cylinder 1 provides additional torque to start the motor via the crankshaft.

At t3, a second cylinder may perform EC, herein referred to as EC cylinder 2, providing additional torque assistance to increase the engine speed. Combustion at EC cylinder 2 remains at the adjusted fuel injection timing and spark ignition timing. Enough torque is provided by combustion to maintain and drive engine speed and the starter motor is deactivated.

At t4, the engine speed reaches the threshold speed 612 and the engine start signal is turned off. The engine is adjusted to nominal combustion where fuel is injected prior to the power stroke of the cylinders and the spark timing occurs before or at TDC of the pistons.

In this way, efficiency of EC during vehicle stop/start may be improved by predicting optimal spark ignition timing based on estimated fuel-air equivalence ratio (phi) and cylinder turbulence. In one example, phi and cylinder turbulence are estimated following fuel injection during the expansion stroke of a cylinder. Spark ignition timing is adjusted based on estimated variations in phi and cylinder turbulence with time, where an overlap between a rich combustion mixture at a spark plug of the cylinder and high turbulence in the cylinder may provide optimal conditions for stable combustion and increased torque output. The torque generated by the adjusted spark timing may enable a demand on a starting device to be at least partially alleviated. A useful lifetime of the starting device may be extended by alleviating demand on the starting device. Additionally, fuel economy of the vehicle equipped with start/stop technology may be increased by predicting and adjusting spark timing during EC.

The technical effect of predicting optimal spark ignition based on estimated phi and turbulence is that a load on the starting device may be reduced as a result of torque assistance from EC and fuel economy in vehicles equipped with start/stop technology may be increased.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The disclosure also provides support for a method for restarting an engine, comprising: responsive to a request for engine restart during an engine idle-stop, adjusting a spark ignition timing based on an estimation of a fuel-air equivalence ratio in a cylinder and an estimation of a cylinder turbulence. In a first example of the method, adjusting the spark ignition timing includes sparking the cylinder during a power stroke of the cylinder. In a second example of the method, optionally including the first example, adjusting the spark ignition timing based on the estimation of the fuel-air equivalence ratio and the estimation of the cylinder turbulence includes inputting data from sensors to update the estimations of the fuel-air equivalence ratio and the cylinder turbulence, wherein the data includes one or more of an engine temperature, a barometric pressure, a fuel rail pressure, an air-to-fuel ratio, an engine position, an injector orientation, and a number of fuel injections. In a third example of the method, optionally including one or both of the first and second examples, adjusting the spark ignition timing based on the estimation of the fuel-air equivalence ratio and the estimation of the cylinder turbulence further includes generating a time trace of the fuel-air equivalence ratio and a time trace of the cylinder turbulence subsequent to a fuel injection event. In a fourth example of the method, optionally including one or more or each of the first through third examples, generating the time trace of the fuel-air equivalence ratio includes estimating a change in the fuel-air equivalence ratio at a spark plug of the cylinder with time following the fuel injection event. In a fifth example of the method, optionally including one or more or each of the first through fourth examples, generating the time trace of the cylinder turbulence includes estimating a change in turbulence within the cylinder with time. In a sixth example of the method, optionally including one or more or each of the first through fifth examples, the fuel injection event occurs after a top dead center position of a piston of the cylinder during an expansion stroke of the cylinder. In a seventh example of the method, optionally including one or more or each of the first through sixth examples, adjusting the spark ignition timing includes initiating spark at the cylinder when the fuel-air equivalence ratio is rich and the cylinder turbulence is high.

The disclosure also provides support for a method for an engine restart event, comprising: responsive to detection of a low urgency request for engine restart, inputting data from a plurality of sensors, outputting an estimated fuel-air equivalence ratio and an estimated cylinder turbulence based on the data from the plurality of sensors, initiating spark at one or more cylinders positioned at a power stroke based on the estimated fuel-air equivalence ratio at a spark plug of each of the one or more cylinders and the estimated cylinder turbulence, and responsive to engine speed reaching a threshold speed, adjusting a timing of spark initiation at the one or more cylinders to a nominal timing. In a first example of the method, initiating spark at the one or more cylinders includes sparking at least one cylinder identified to be positioned at a power stroke. In a second example of the method, optionally including the first example, the method further comprises: detecting the low urgency request based on one or more of a below-threshold demand for torque and a below-threshold exhaust system temperature and wherein the below-threshold demand for torque is one or more of a tip-in at an accelerator pedal below a threshold accelerator pedal tip-in and a release of a brake pedal and wherein the below-threshold exhaust system temperature is a temperature below a catalyst light-off temperature. In a third example of the method, optionally including one or both of the first and second examples, outputting the estimated fuel-air equivalence ratio includes outputting the estimated fuel-air equivalence ratio as a change in the estimated fuel-air equivalence ratio with time at the spark plug of each of the one or more cylinders. In a fourth example of the method, optionally including one or more or each of the first through third examples, outputting the estimated cylinder turbulence include outputting the estimated cylinder turbulence as a change in the estimated cylinder turbulence with time at each of the one or more cylinders. In a fifth example of the method, optionally including one or more or each of the first through fourth examples, initiating spark at the one or more cylinders includes sparking a first cylinder of the one or more cylinders at an estimated time during the power stroke, the estimated time based on an overlap between a rich estimated fuel-air equivalence ratio and a high estimated cylinder turbulence, and sparking a second cylinder of the one or more cylinders at the estimated time, after the sparking of the first cylinder. In a sixth example of the method, optionally including one or more or each of the first through fifth examples, inputting data from the plurality of sensors includes inputting the data after fuel is injected at the one or more cylinders and wherein inputting data from the plurality of sensors includes inputting the data after fuel is injected at the one or more cylinders and wherein the fuel is injected before at least one cylinder of the one or more cylinders reaches a predetermined number of degrees after top dead center. In a seventh example of the method, optionally including one or more or each of the first through sixth examples, the method further comprises: activating a starting device in response to detection of a low urgency request for engine restart and wherein an amount of torque delivered by initiating spark at one or more cylinders supplements an amount of torque provided by the starting device. In an eighth example of the method, optionally including one or more or each of the first through seventh examples, the amount of torque provided by the starting device is less than an amount of torque provided by the starting device when a request for engine restart is of medium or high urgency. In a ninth example of the method, optionally including one or more or each of the first through eighth examples, adjusting the timing of spark initiation to the nominal timing includes adjusting the timing to a timing optimized for maximum power generation at the one or more cylinders.

The disclosure also provides support for an engine, comprising: a starting device coupled to a crankshaft of the engine, a plurality of cylinders, each of the plurality of cylinders including a spark plug and at least one fuel injector, wherein a piston position of each of the plurality of cylinders is adjusted based on rotation of the crankshaft, and a controller configured with executable instructions stored in non-transitory memory which, when executed during an idle-stop mode of the engine, cause the controller to: assist the starting device to restart the engine by generating torque at one or more cylinders during a power stroke of the one or more cylinders, wherein the torque is generated by initiating spark at the one or more cylinders at a timing based on an estimated fuel-air equivalence ratio and an estimated cylinder turbulence. In a first example of the system, the estimated fuel-air equivalence ratio and the estimated cylinder turbulence are based on real-time data collected from sensors of the engine.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for restarting an engine, comprising:
responsive to a request for engine restart during an engine idle-stop,
adjusting a spark ignition timing based on an estimation of a fuel-air equivalence ratio in a cylinder and an estimation of a cylinder turbulence,
wherein the estimation of the fuel-air equivalence ratio and the estimation of the cylinder turbulence is based on data inputted from a plurality of sensors after fuel is injected at one or more cylinders; and
wherein the fuel is injected before at least one cylinder of the one or more cylinders reaches a predetermined number of degrees after top dead center.

2. The method of claim 1, wherein adjusting the spark ignition timing includes sparking the cylinder during a power stroke of the cylinder.

3. The method of claim 1, wherein adjusting the spark ignition timing based on the estimation of the fuel-air equivalence ratio and the estimation of the cylinder turbulence includes inputting the data from the plurality of sensors to update the estimations of the fuel-air equivalence ratio and the cylinder turbulence, wherein the data includes one or more of an engine temperature, a barometric pressure, a fuel rail pressure, an air-to-fuel ratio, an engine position, an injector orientation, and a number of fuel injections.

4. The method of claim 3, wherein adjusting the spark ignition timing based on the estimation of the fuel-air equivalence ratio and the estimation of the cylinder turbulence further includes generating a time trace of the fuel-air equivalence ratio and a time trace of the cylinder turbulence subsequent to a fuel injection event.

5. The method of claim 4, wherein generating the time trace of the fuel-air equivalence ratio includes estimating a change in the fuel-air equivalence ratio at a spark plug of the cylinder with time following the fuel injection event.

6. The method of claim 5, wherein generating the time trace of the cylinder turbulence includes estimating a change in turbulence within the cylinder with time.

7. The method of claim 4, wherein the fuel injection event occurs after a top dead center position of a piston of the at least one cylinder during an expansion stroke of the at least one cylinder.

8. The method of claim 1, wherein adjusting the spark ignition timing includes initiating spark at the cylinder when the fuel-air equivalence ratio is rich and the cylinder turbulence is high.

9. A method for an engine restart event, comprising:
detecting a low urgency request for engine restart based on one or more of a below-threshold demand for torque and a below-threshold exhaust system temperature; and responsive to detection of the low urgency request for engine restart, inputting data from a plurality of sensors;

outputting an estimated fuel-air equivalence ratio and an estimated cylinder turbulence based on the data from the plurality of sensors;

initiating spark at one or more cylinders positioned at a power stroke based on the estimated fuel-air equivalence ratio at a spark plug of each of the one or more cylinders and the estimated cylinder turbulence; and responsive to engine speed reaching a threshold speed, adjusting a timing of spark initiation at the one or more cylinders to a nominal timing.

10. The method of claim 9, wherein initiating spark at the one or more cylinders includes sparking at least one cylinder identified to be positioned at a power stroke.

11. The method of claim 9, wherein the below-threshold demand for torque is one or more of a tip-in at an accelerator pedal below a threshold accelerator pedal tip-in and a release of a brake pedal and wherein the below-threshold exhaust system temperature is a temperature below a catalyst light-off temperature.

12. The method of claim 9, wherein outputting the estimated fuel-air equivalence ratio includes outputting the estimated fuel-air equivalence ratio as a change in the estimated fuel-air equivalence ratio with time at the spark plug of each of the one or more cylinders.

13. The method of claim 9, wherein outputting the estimated cylinder turbulence include outputting the estimated cylinder turbulence as a change in the estimated cylinder turbulence with time at each of the one or more cylinders.

14. The method of claim 9, wherein initiating spark at the one or more cylinders includes sparking a first cylinder of the one or more cylinders at an estimated time during the power stroke, the estimated time based on an overlap between a rich estimated fuel-air equivalence ratio and a high estimated cylinder turbulence, and sparking a second cylinder of the one or more cylinders at the estimated time, after the sparking of the first cylinder.

15. The method of claim 9, wherein inputting data from the plurality of sensors includes inputting the data after fuel is injected at the one or more cylinders and wherein the fuel is injected before at least one cylinder of the one or more cylinders reaches a predetermined number of degrees after top dead center.

16. The method of claim 9, further comprising activating a starting device in response to the detection of the low urgency request for engine restart and wherein an amount of torque delivered by initiating spark at one or more cylinders supplements an amount of torque provided by the starting device.

17. The method of claim 16, wherein the amount of torque provided by the starting device is less than an amount of torque provided by the starting device when a request for engine restart is of medium or high urgency.

18. The method of claim 9, wherein adjusting the timing of spark initiation to the nominal timing includes adjusting the timing to a timing optimized for maximum power generation at the one or more cylinders.

19. An engine, comprising:

a starting device coupled to a crankshaft of the engine;

a plurality of cylinders, each of the plurality of cylinders including a spark plug and at least one fuel injector, wherein a piston position of each of the plurality of cylinders is adjusted based on rotation of the crankshaft; and a controller configured with executable instructions stored in non-transitory memory which, when executed during an idle-stop mode of the engine, cause the controller to:

activate a starting device in response to detection of a low urgency request for engine restart; and assist the starting device to restart the engine by generating torque at one or more cylinders during a power stroke of the one or more cylinders, wherein the torque is generated by initiating spark at the one or more cylinders at a timing based on an estimated fuel-air equivalence ratio and an estimated cylinder turbulence;

wherein an amount of the generated torque supplements an amount of torque provided by the starting device; and wherein the amount of torque provided by the starting device is less than an amount of torque provided by the starting device in response to detection of one of a medium urgency request for engine restart or a high urgency request for engine restart.

20. The engine of claim 19, wherein the estimated fuel-air equivalence ratio and the estimated cylinder turbulence are based on real-time data collected from sensors of the engine.

* * * * *